CUTTING MEANS FOR A MAGNETIC RECORDING TAPE REWINDING APPARATUS

Filed June 28, 1967 2 Sheets-Sheet 1

INVENTORS.
KIRK R. ARMSTRONG,
EDWARD C. MIKOLYCZYK,
CARL S. NELSON,

BY THEIR ATTORNEYS
Spensley & Horn

Feb. 17, 1970 C. S. NELSON ET AL 3,495,782

CUTTING MEANS FOR A MAGNETIC RECORDING TAPE REWINDING APPARATUS

Filed June 28, 1967 2 Sheets-Sheet 2

INVENTORS.
KIRK R. ARMSTRONG,
EDWARD C. MIKOLYCZYK,
CARL S. NELSON,
By THEIR ATTORNEYS Spensley & Horn United States Patent Office 3,495,782
Patented Feb. 17, 1970

3,495,782
CUTTING MEANS FOR A MAGNETIC RECORDING TAPE REWINDING APPARATUS

Carl S. Nelson, Los Angeles, Kirk R. Armstrong, Costa Mesa, and Edward C. Mikolyczyk, Los Angeles, Calif., assignors to Capitol Records, Inc., Hollywood, Calif., a corporation of California Filed June 28, 1967, Ser. No. 649,682
Int. Cl. B65h *19/26, 21/02;* B26d *5/38*
U.S. Cl. 242—56 8 Claims

ABSTRACT OF THE DISCLOSURE

Automatic apparatus for rewinding magnetic recording tape and cutting the tape when a section containing a control tone passes a reproduce head. Reproduce head output is fed through frequency selective filters in electronic control circuitry to a transformer primary winding in the input of a positive feedback switching transistor stage, the primary being tuned to the control signal frequency, with the secondary winding being in the feedback loop. The constant amplitude pulse output of the switching transistor stage is integrated and used to trigger motor shut off, brake release and tape cutting functions.

BACKGROUND OF THE INVENTION

In the commercial production of magnetically recorded tapes for stereo tape cartridges it is the usual practice in duplicating program material from a master tape to record the program material several times in succession on a long tape, the tape being wound onto a large supply reel. Thus, several so-called "cartridge equivalents" are contained on the supply reel. The tape is later rewound from the supply reel onto tape cartridge hubs, the tape being cut at the end of each recorded program, the ends of the rewound tape being subsequently joined to form an endless loop. An inaudible control tone recorded at the end of each of the repeated programs on the supply reel provides electrical identification of completion of a cartridge equivalent, the control tone enabling automatic control of the operation of winding motors and tape cutting apparatus. However, prior art attempts to provide a machine of the character described have always required a tortuous or complex threading path for the tape from the supply reel to the cartridge hub resulting in considerable labor and hence expense.

Additionally, in prior art attempts of such machines there has been a tendency for the cut tape to run off or become tangled about the cartridge hub because of the failure to properly brake the cartridge hub. In one prior art attempt to provide cutting from a supply reel, it may be necessary for an operator to listen for the tone signal and to normally actuate the semiautomatic actuating means. In this system the path for the tape was complicated as the frequency and amplitude of the tone signal was critical thus requiring a tangible tape throughout the path, this in turn requiring it to be anything by strayed. Thus, operation time is great adding substantially to the cost. Further, prior art attempts to automate the winding of tape cartridges have utilized electromechanical devices and electronic control circuitry which have necessarily imposed undesirable limitations on tape speed during the rewinding operation.

SUMMARY OF THE INVENTION

The present invention is directed toward improved apparatus for automatically rewinding magnetic recording tape and provides a uniform tension and apparatus for cutting the tape within a tape section containing a predetermined control tone, the apparatus being easily capable of operation at tape speeds on the order of 60 inches per second.

In the presently preferred embodiment the tape supply reel is mounted on the rotatable hub of an electromechanical brake assembly and the tape is wound therefrom onto a tape cartridge hub mounted on the shaft of a take-up motor including dynamic braking. In the tape path there are positioned an idler assembly for maintaining constant tape tension, a reproduce head for detecting the control tone recorded on the tape, a solenoid actuated tape cutting assembly, and a capstan drive-pinch roller assembly, all of these assemblies are in a straight line and mounted above the arm in a cover defining a slot for quick and simple insertion of the tape. The reproduce head output is fed to an electric control circuit which is selectively actuated by the control tone to shut off the capstan drive and take-up motors, and actuate the tape cutting mechanism and brake assembly.

The electric control circuit includes a filter network having the control tone frequency within its pass band, a transformer having its primary winding tuned to the control tone frequency, a positive feedback switching transistor stage having the secondary winding of the transformer in its feedback loop, an integrator coupled to the output of the switching transistor stage, the output of the integrator being used to trigger an electrical toggle, the output of the electrical toggle controlling operation of the electromechanical brake assembly, the drive motors and cutter solenoid.

DESCRIPTION OF THE PREFERRED EMBODIMENT

Figure 1:
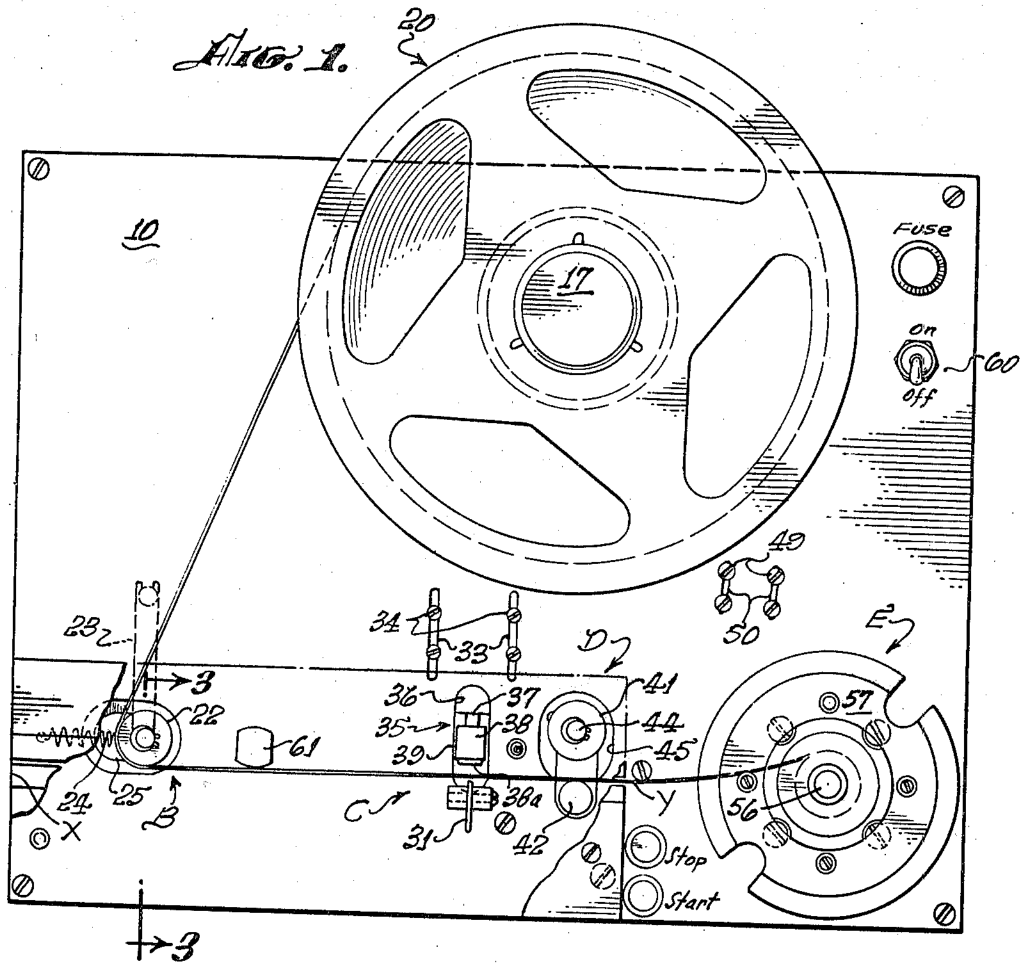
FIGURE 1 is a plan view showing the major mechanical components of a present invention tape rewinding apparatus.
Figures 2, 3:
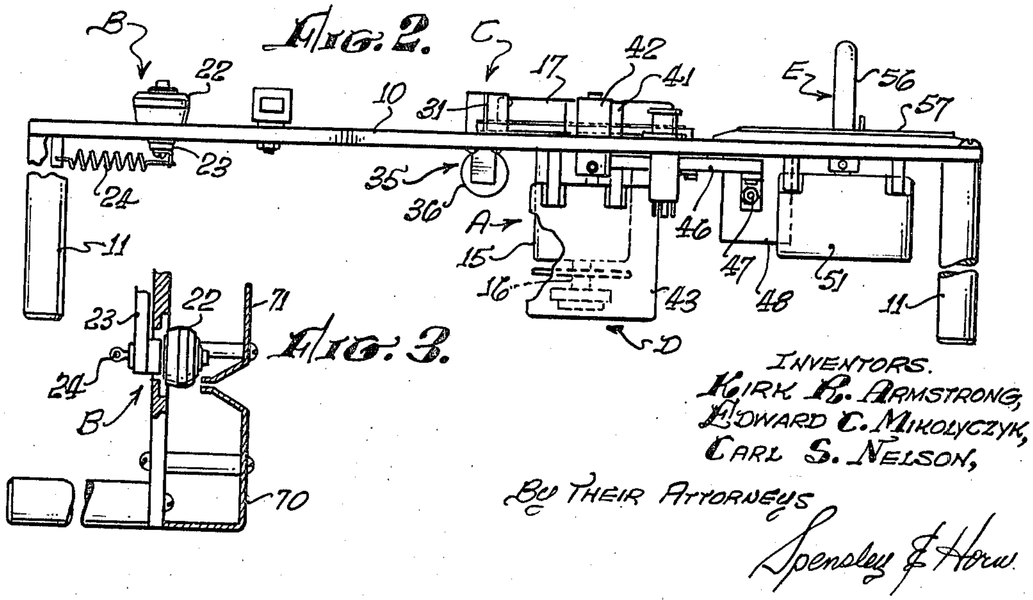
FIGURE 2 is a front elevation view of the apparatus of FIGURE 1.
FIGURE 3 is a side elevation of the apparatus of FIGURE 1.

Turning now to the drawings, in FIGURES 1, 2 and 3 there are shown plan and elevation views of a presently preferred embodiment of tape rewinding apparatus in accordance with the present invention. The electrical and mechanical components are mounted on a rectangular base plate 10 supported at each of its corners by legs 11. There are five main assemblages of components generally indicated as a supply reel brake assembly A, an idler assembly B, a tape cutting assembly C, a capstan drive-pinch roller D, and a take-up motor assembly E. A cover F, comprising two sheet metal sections each having a flange section 70 and 71 define a vertical slot through which the tape from the supply reel to the hub assembly is dropped so that it will properly fall along the path of the assemblies B through E. This cover F is shown in FIGURE 3. Thus, the magnetic tape may be quickly and easily threaded by dropping the tape in one motion through the slot defined by the cover 70, 71 as the tape passes in a straight line (rather than following one or more curved paths) from point X to Y. While the tape is dropped past the point X in FIGURE 1 since the slot is open to the left thereof, such has not been shown in the drawing. After the tape has been dropped by the operator in a straight line, the portion of the tape extending to the left beyond idler wheel 22, will as slack be taken up when rotation of the reels has commenced as is hereinafter explained.

The supply reel brake assembly A is of the type generally comprising a rotatable hub with means for selectively restricting hub rotation. In the illustrated embodiment the supply reel brake assembly A includes a solenoid operated electromechanical brake, generally indicated by the reference numeral 15, mounted to the underside of the base plate 10, a rotatable shaft 16 extending from the brake 15 through a hole in the base plate 10, and a supply reel hub 17 affixed to the upper end of shaft 16 and projecting above the base plate 10. The hub 17 comprises a circular raised portion and an underlying annular ring portion for receiving and supporting a supply reel 20. The shaft 16, hub 17 and supply reel 20 are free to rotate as a unit until the brake assembly solenoid is electrically de-energized to actuate the brake. Such units are readily commercially available and hence, will not be discussed in further detail.

The idler assembly B is also of a type well known in the art for maintaining uniform tape tension. In the illustrated embodiment the idler assembly B includes a crowned idler wheel 22 rotatably mounted on a pivot arm 23 which is loaded by a helical spring 24. As can best be seen from the plan view of FIGURE 1, the idler wheel 22 is laterally movable within a slotted raceway 25 in the base plate 10, the idler wheel being normally urged toward the lefthand end of the slot by the compressive forces of the spring 24. The tension of tape passing around the idler wheel 22 will cause movement of the idler wheel along the raceway 25, thereby stretching and tensioning the spring 24. Thus, the action of the spring 24 will insure a substantially constant tape tension.

The tape cutting assembly C generally comprises a vertically oriented cutter blade 31 secured to the upper surface of the base plate 10, and a solenoid actuable tape cutter block assembly generally indicated by the reference numeral 35. The cutter block assembly 35 includes an electrical solenoid 36 mounted beneath the base plate 10 and having a plunger rod 37, the projecting end of which is mounted to actuate cutter block 38. The solenoid 36 is mounted so that its rod 37 is in alignment with the cutter blade 31, the cutter block 38 projecting upwards through a slot 39 in the base plate 10. The face of the cutter block 38 is provided with an anvil surface **38*a* having a height greater than the width of the tape to be cut and being in substantial vertical orientation with the cutter blade 31. In its normal rest position with solenoid 36 de-energized the solenoid rod 37 will be in its fully withdrawn position as shown in FIGURE 1, with the cutter block 38 spaced away from the cutter blade 31. Upon actuation of the solenoid 36 by electrical energization of its solenoid coil, the solenoid rod 37 will move to a fully extended position driving the cutter block 38 hard against the cutter blade 31 to sever any tape pinched therebetween. The solenoid 36 is adjustably mounted by means of screws 34 passing through elongate slots 33 in base plate 10**.

The capstan drive-pinch roller assembly D generally comprises a pivotally mounted pinch roller 41 disposed adjacent a rotatable capstan 42 driven by a capstan motor 43. The pinch roller 41 is rotatably mounted on a shaft 44 extending vertically through a slot 45 in base plate 10, the shaft 44 being secured to one end of a swing arm 46 pivotally mounted to the underside of base plate 10. The other end of the swing arm 46 is secured to the projecting end of the plunger rod 47 of an electrically actuable solenoid 48, the solenoid 48 being adjustably mounted to the underside of the base plate 10 by means of screws 49 extending through slot 50. In its normal position with the solenoid 48 in its de-actuated position the pinch roller 41 is spaced away from the capstan 42 as shown in FIGURE 1. In this condition the solenoid plunger rod 47 is in its fully extended position, the swing arm 46 being normally urged to this condition by means of a loading spring, not shown. Upon electrical energization of the coil of solenoid 48 the rod 47 is drawn into the coil, thereby pivoting swing arm 46 and urging the idler wheel towards the capstan. The capstan 42 is rotatably mounted to the shaft of the capstan drive motor 43, the drive motor 43 being disposed beneath the base plate 10 with its shaft projecting upwardly therethrough.

The take-up motor assembly E generally comprises a motor 51 mounted to the underside of the base plate 10 and having its shaft extending vertically upwards therethrough, and a take-up reel spindle assembly 55 mounted to the shaft of the motor 51. The spindle assembly includes a central projecting spindle 56 and an underlying circular support flange 57, the spindle assembly being so constructed and arranged to receptively engage a tape cartridge hub.

The tape on the supply reel as has previously been indicated has recorded thereon repeatedly the program which is to be rewound into a cartridge for subsequent use. Following each complete program on the tape there is also recorded a so-called tone signal. It is basically a sine wave signal of a predetermined amplitude and frequency. In the presently preferred embodiment this is either 150 or 300 cycles per second signal whose amplitude is less than a recorded level yielding 3 percent total harmonic distortion. These parameters are not critical but are chosen for convenience only. This signal is typically recorded over a length of tape of from 12 to 18 inches following the end of each program.

Figure 4:
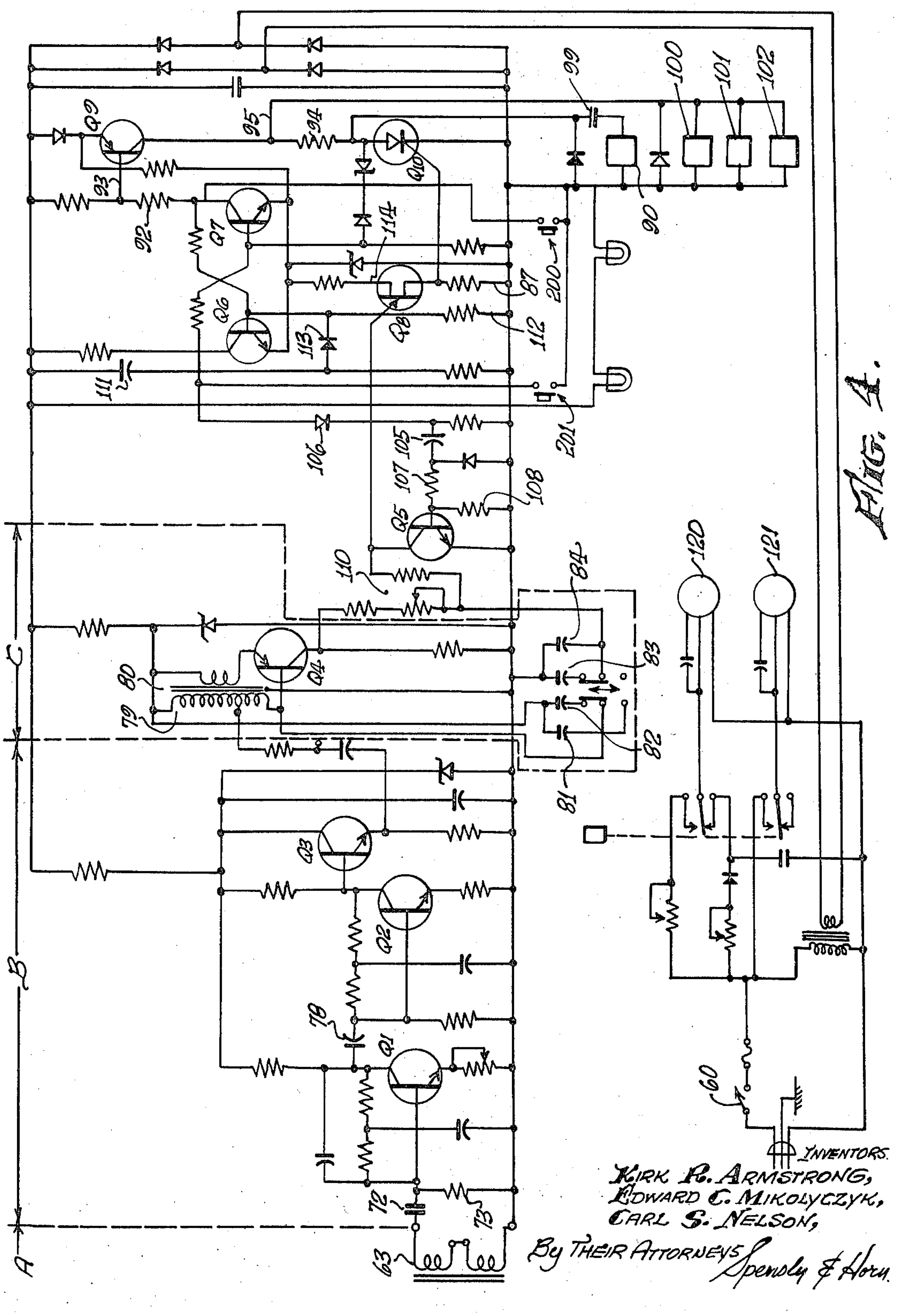
FIGURE 4 is a schematic diagram of an electric control circuit for the apparatus in FIGURE 1.

Upon energization of the circuit of FIGURE 4 by closing of switch 60, and depression of start button 200, and with the tone signal passing over the head 61 and with switch 62 in the 300 cycles per second position (assuming that 300 cycles per second is the tone frequency) the following will occur. The head winding 63 represents this signal to reproduce amplifier and broadband filter G. The RC networks in amplifier B have values chosen so that all signals above 300 cycles per second are substantially attenuated while those below 300 cycle per second are amplified, previously by the combination of transistors Q1 and Q2. The first stage of the amplifier and broadband filter, namely transistor Q1, serves to amplify the control tone frequency of 300 cycles per second produced from the magnetic tape reproduce head 63. The RC network which serves to provide broadband discrimination between the control tone and other signals is a feedback filter associated with transistor Q1 consisting of capacitor 66, head winding 63 and resistor 73. Capacitor 72 merely serves as a coupling means between the base of transistor Q1 and the magnetic head winding 63 and resistor 73 serves as a biasing means for the base electrode of the transistor Q1. Transistor Q2 receives the output signal from the collector of transistor Q1 at the base of transistor Q2. Transistor Q2 serves as a second stage of amplification in circuit B. Transistor Q2 in turn drives emitter follower stage which consists of transistor Q3. Capacitor 78 serves as a coupling means between stage Q1 and Q2.

Emitter follower transistor Q3 serves as a constant voltage generator and drives a tuned network including the primary winding 79 of transformer 80 together with capacitors 81 and 82. Transistor Q4 is configured in a positive feedback mode with parallel tuned transformer 80. The collector of transistor Q4 with no control tone present appears at ground potential, that is, no current flows in the stage except when the 300 cycles per second signal appears at the head 63. The control tone from transistor Q3 is spectrally discriminated upon by the tuned transformer 80 and will cause a sine wave current to flow in transformer 80. When the negative peak potential of the sine wave voltage exceeds a nominal $\frac{6}{10}$ of a volt at the base of transistor Q4, current will flow through the collector load resistance 81 associated with transistor Q4. This is because there is required to be a voltage in excess of the forward voltage drop of the base to emitter of transistor Q4 before current will flow. It is desirable to prevent the tuned circuit including the primary winding of transformer 80 from oscillating as the stage including the transformer 80 and Q4 is normally cut off. When an input signal to transformer winding 79 is received and the amplitude of that signal exceeds the conducting threshold at the base of transistor Q4, the stage which includes a substantial amount of gain will conduct. As transistor Q4 conducts the information current passing through the emitter winding is in a positive feedback mode which will cause the stage to avalanche and the output or signal shape at the collector of transistor Q4 will become square to the consequence of saturation so that it will effectively look at a very small amplitude signal just above or at the threshold of conduction and take that information and avalanche it so that it operates much like a switch. This circuit configuration is sufficient to cause a substantial pulse width in the square wave with the sinusoid information so that the signal may vary as much as 3 to 1 amplitude-wide. At the input side of the stage C while the output amplitude will be substantially constant and the pulse width will be substantially constant, the output signal from transistor Q4 is integrated by means of capacitors 83 and 84. The positive pulses from transistor Q4 charge the integrating capacitors 83 and 84 at a rate which is proportional to the number of pulses received per unit time, i.e., received the input of transistor Q4. When capacitors 83 and 84 are charged to a given predetermined potential, unijunction transistor Q8 will become conductive and a current will flow through resistor 87. The integrating capacitors 83 and 84 will discharge through transistor Q8. The resultant wave form across resistor 87 is a positive pulse of approximately 3 volts in magnitude of a 100 microsecond duration. This short duration pulse causes the silicon control rectifier Q10 to become conductive thereby providing a discharge path for capacitor 99 which is in series with the output of SCR Q10 and the input to cutter solenoid 90. The negative going voltage step function from the SCR Q10 reverses to a flip-flop circuit consisting of transistors Q6 and Q7. A flip-flop circuit including transistors Q6 and Q7 which is, upon being armed, purposely balanced so that Q6 is ordinarily on or conducting and Q7 is off or not conducting. When Q7 begins to conduct, Q6 will be turned off and transistor Q9 will be caused to conduct as the collector Q7 which is at its output will forward bias the base of transistor Q9 through resistor 92 over lead 93. Conduction of transistor Q9 causes capacitor 99 to be charged up as current will flow through the collector of transistor Q9 thence through resistor 94 into capacitor 99. Further, current will also be drawn over lead 95 from the collector of transistor Q9 energizing solenoids 100, 101 and 102 respectively, which are associated with the capstan solenoid, the brake release solenoid and the motor run relay respectively. Upon transistor Q6 being switched from its conducting to its non-conducting mode, capacitor 105 will begin to be charged through diode 106 which is connected to the collector of transistor Q6. Thus, there is provided a clamp from a voltage point of view on transistor Q5 and the integrating voltage to the unijunction transistor Q8. The period of the clamp is a function of the RC time constants of the combination of capacitor 105, resistor 107 and resistor 108. The reason for clamping Q5 is to prevent cutter solenoid action and the machine stop function while the magnetic tape is coming up to speed and passing the magnetic tape reproduce head. That is, it is desirable not to have the cutter solenoid 90 be actuated when this tape is being accelerated from its rest position to its terminal velocity which in the presently preferred embodiment is 60″ per second. The clamp is necessary as if the tape comes up to speed it will pass through frequencies of program information which will be in the range of 300 cycles as a consequence of the increasing tape velocity and thus it is necessary to hold off possible activation of the cutter solenoid 90 as it might otherwise be caused to activate and cut the tape at a point other than the tone signal following a program. The time for this activation is approximately 5 seconds. The time period is controlled by the time constant of capacitor 105 together with resistors 107 and 108 as previously mentioned. As soon as the capacitor is charged Q5 ceases to draw a base current and the clamp is released allowing the unijunction transistor Q8 to again conduct as Q5 would otherwise cause a shorting of the input electrode to the unijunction transistor Q8.

Another aspect of the circuit to be considered is that for the machine to assume an off position, stages Q6 in the flip-flop circuit must be in saturation, i.e., it must be conducting and Q7 non-conducting when the power is first applied to the machine by the activation or closing of switch 60. Thus, when power is first supplied, capacitor 111 is charging via diode 113 and transistor Q6. Capacitor 111 charges through this path which also includes resistor 112. 111 thus becomes fully charged to 24 volts, the B plus potential. This effectively back biases diode 113 by the difference in voltage between that maintained by a Zener diode 114. Zener diode 114 is a Zener diode maintaining a voltage between ground and the emitter of transistor Q6 at approximately 6.2 volts.

It should be noted that one of the important aspects of the present invention is the manner in which the cutter solenoid is actuated. It will be recalled that the cutter solenoid is actuated upon discharge of capacitor 99 through the cutter solenoid coil 90. This permits the cutter solenoid in the presently preferred embodiment to be actuated by a large current (i.e., of the order of 5 amps as the peak discharge current) from a relativevly small current source (i.e., of the order of 100 milliamperes or the peak charging current) as the cutter solenoid is not actuated until capacitor 99 develops up its charge to a sufficient level. The remaining portion of the circuit not heretofore described involves the take-up motor 120 and the capstan motor 121. These are energized upon closing of the switch 60 and energization of solenoid 102 in the matter heretofore explained. It should be pointed out in this connection that one important aspect of the present invention is the provision of braking on both the supply reel motor and the take-up shaft motor. The supply reel includes a standard beryllium copper brake and need not be further explained. The take-up motor employs dynamic braking in a manner known to the art. The provision of the composite braking described in the two motors associated with the supply reel and the take-up motor are important in preventing jamming and/or excess tape spillage following the automatic cutting operation.

The present invention apparatus thus results in accurate and automatic cutting of the tape on receipt of the tone or critical signal. The accuracy is such that following the first 6–12″ (chosen as desired) of the tone signal, the cut in the tape can be made with an accuracy of from ½ to 1″.

What is claimed as new is:

1. Apparatus for automatically rewinding a predetermined length of magnetic recording tape from a first reel along a predetermined path onto a second reel and cutting said tape when said predetermined length has been unwound from said first reel, the trailing end of said predetermined length being defined by a section of tape containing a recorded tone of a predetermined frequency, said apparatus comprising:

(a) means for rotatably mounting said first reel at one end of said predetermined path;

(b) means for rotatably mounting said second reel at the other end of said predetermined path;

(c) cutting means disposed along said predetermined path for selectively cutting said tape, said cutting means being selectively actuable in response to an applied electrical signal;

(d) transducer means disposed along said predetermined path for producing an electrical output signal representative of said recorded tone recorded on said tape; and (e) an electrical control circuit having its input coupled to the output of said transducer means and its output coupled to said cutting means, whereby said electrical control signal will actuate said cutting means upon receipt of said recorded tone.

2. Apparatus for automatically rewinding a predetermined length of magnetic recording tape from a first reel along a predetermined path onto a second reel and cutting said tape when said predetermined length has been unwound from said first reel, the trailing end of said predetermined length being defined by a section of tape containing a recorded tone of a predetermined frequency, said apparatus comprising:

(a) means for rotatably mounting said first reel at one end of said predetermined path;

(b) means for rotatably mounting said second reel at the other end of said predetermined path;

(c) cutting means disposed along said predetermined path for selectively cutting said tape, said cutting means being selectively actuable in response to an applied electrical signal;

(d) transducer means disposed along said predetermined path for producing an electrical output signal representative of said recorded tone recorded on said tape;

(e) said cutting means and said transducer means being disposed along a substantially straight line in the path between said first reel and said second reel; and (f) an electrical control circuit having its input coupled to the output of said transducer means and its output coupled to said cutting means, whereby said electrical control signal will actuate said cutting means upon receipt of said recorded tone.

3. Apparatus for automatically rewinding a predetermined length of magnetic recording tape from a first reel along a predetermined path onto a second reel and cutting said tape when said predetermined length has been unwound from said first reel, the trailing end of said predetermined length being defined by a section of tape containing a recorded tone of a predetermined frequency, said apparatus comprising:

(a) means for rotatably mounting said first reel at one end of said predetermined path;

(b) means for rotatably mounting said second reel at the other end of said predetermined path;

(c) cutting means disposed along said predetermined path for selectively cutting said tape, said cutting means being selectively actuable in response to an applied electrical signal;

(d) transducer means disposed along said predetermined path for producing an electrical output signal representative of said recorded tone recorded on said tape;

(e) said cutting means and said transducer means being disposed along a substantially straight line in the path between said first reel and said second reel;

(f) means overlying said cutter means and said transducer means, said last named means defining a substantially linear slot through which the tape from said first reel to said second reel may be placed to insure its ready positioning; and (g) an electrical control circuit having its input coupled to the output of said transducer means and its output coupled to said cutting means, whereby said electrical control signal will actuate said cutting means upon receipt of said recorded tone.

4. Apparatus for automatically rewinding a predetermined length of magnetic recording tape from a first reel along a predetermined path onto a second reel and cutting said tape when said predetermined length has been unwound from said first reel, the trailing end of said predetermined length being defined by a section of tape containing a recorded tone of a predetermined frequency, said apparatus comprising:

(a) means for rotatably mounting said first reel at one end of said predetermined path;

(b) means for rotatably mounting said second reel at the other end of said predetermined path;

(c) cutting means disposed along said predetermined path for selectively cutting said tape, said cutting means being selectively actuable in response to an applied electrical signal;

(d) transducer means disposed along said predetermined path for producing an electrical output signal representative of said recorded tone recorded on said tape;

(e) an electrical control circuit having its input coupled to the output of said transducer means, said circuit including amplifying means and band pass filter means at its input to pass said predetermined frequency within its band pass; and (f) capacitor means being coupled between said circuit and said cutting means for providing a signal which is the result of the charge built up across said capacitor in order to selectively actuate said cutting means.

5. Apparatus as defined in claim 1, wherein said electrical contact circuit has its input coupled to the output of said transducer means, said electrical control circuitry including band pass filter means as its input and having said predetermined frequency within its pass band, a transformer having a secondary winding and a primary winding tuned to said predetermined frequency and coupled to the output of said band pass filter means, a positive feedback switching transistor stage having said transformer secondary winding in its feedback loop, and integrating means coupled to the output of said switching transistor stage, the output of said integrating means being coupled to toggle means as the trigger therefor, the output of said toggle means being coupled to said brake means, said drive means and said cutting means as the electrical control signals therefor.

6. Apparatus for automatically rewinding a predetermined length of magnetic recording tape from a first reel along a predetermined path onto a second reel and cutting said tape when said predetermined length has been unwound from said first reel. the trailing end of said predetermined length being defined by a section of tape containing a recorded tone of a predetermined frequency, said apparatus comprising:

(a) means for rotatably mounting said first reel at one end of said predetermined path including brake means to prevent reel rotation, said brake means being selectively releasable in response to an applied electrical control signal;

(b) means for rotatably mounting said second reel at the other end of said predetermined path including drive means for effecting reel rotation, said drive means being actuable in response to an applied electrical control signal;

(c) cutting means disposed along said predetermined path for selectively cutting said tape, said cutting means being selectively actuable in response to an applied electrical signal;

(d) transducer means disposed along said predetermined path for producing an electrical output signal representative of said recorded tone recorded on said tape; and (e) an electrical control circuit having its input coupled to the output of said transducer means, said electrical control circuitry including band pass filter means at its input and having said predetermined frequency within its pass band, a transformer having a secondary winding and a primary winding tuned to said predetermined frequency and coupled to the output of said band pass filter means, a positive feedback switching transistor stage having said transformer secondary winding in its feedback loop, and integrating means coupled to the output of said switching transistor stage, the output of said integrating means being coupled to toggle means as the trigger therefor, the output of said toggle means being coupled to said brake means, said drive means and said cutting means as the electrical control signals therefor.

7. Apparatus for automatically rewinding a predetermined length of magnetic recording tape from a first reel along a predetermined path onto a second reel and cutting said tape when said predetermined length has been unwound from said first reel; the trailing end of said predetermined length being defined by a section of tape containing a recorded tone of a predetermined frequency, comprising:

(a) means for rotatably mounting said first reel at one end of said predetermined path including brake means to prevent reel rotation, said brake means being selectively releasable in response to an applied electrical control signal;

(b) means for rotatably mounting said second reel at the other end of said predetermined path including drive means for effecting reel rotation, said drive means being actuable in response to an applied electrical control signal;

(c) cutting means disposed along said predetermined path for selectively cutting said tape, said cutting means being actuable in response to an applied electrical signal;

(d) transducer means disposed along said predetermined path for producing an electrical output signal representative of said recorded tone recorded on said tape; and (e) an electrical control circuit powered from a source of DC operating potential and having its input coupled to the output of said transducer means, said electrical control circuitry including band pass filter means at its input and having said predetermined frequency within its pass band, a transformer having a secondary winding and a primary winding tuned to said predetermined frequency and coupled to the output of said band pass filter means, a positive feedback switching transistor stage having said transformer secondary winding in its feedback loop, and integrating means coupled to the output of said switching transistor stage, the output of said integrating means being coupled to toggle means as the trigger therefor, the output of said toggle means being coupled to said brake means, said drive means and said cutting means as the electrical control signals therefor.

8. Apparatus for automatically rewinding a predetermined length of magnetic recording tape from a first reel along a predetermined path onto a second reel and cutting said tape when said predetermined length has been unwound from said first reel, the trailing end of said predetermined length being defined by a section of tape containing a recorded tone of a predetermined frequency, said apparatus comprising:

(a) means for rotatably mounting said first reel at one end of said predetermined path;

(b) means for rotatably mounting said second reel at the other end of said predetermined path;

(c) cutting means disposed along said predetermined path for selectively cutting said tape, said cutting means being selectively actuable in response to an applied electrical signal;

(d) transducer means disposed along said predetermined path for producing an electrical output signal representative of said recorded tone recorded on said tape, said signal being of a frequency which is apart from the desired spectral response of the recorded information on said magnetic tape; and (e) an electrical control circuit having its input coupled to the output of said transducer means and its output coupled to said cutting means, whereby said electrical control signals will actuate said cutting means upon receipt of said recorded tone.

References Cited

UNITED STATES PATENTS

| | | | |
|---|---|---|---|
| 2,357,976 | 9/1944 | Roesen. | |
| 2,670,212 | 2/1954 | Heller et al. | |
| 3,191,881 | 6/1965 | Campbell et al. | 242—74.2 X |
| 3,276,708 | 10/1966 | Yefsky | 242—67.3 X |
| 3,387,797 | 6/1968 | Rahmel et al. | 242—55.11 |

GEORGE F. MAUTZ, Primary Examiner

U.S. Cl. X.R.

83—371; 242—67.3; 340—174.1